Aug. 29, 1967  A. H. DRAIN  3,338,104
ADJUSTABLE PROGRAMMING ARRANGEMENT
Filed June 24, 1965

INVENTOR
Alfred H. Drain

United States Patent Office 3,338,104
Patented Aug. 29, 1967

3,338,104
ADJUSTABLE PROGRAMMING ARRANGEMENT
Alfred H. Drain, Richland, Pa., assignor to Heppenstall Company, Pittsburgh, Pa., a corporation of Pennsylvania
Filed June 24, 1965, Ser. No. 466,575
8 Claims. (Cl. 74—3.52)

ABSTRACT OF THE DISCLOSURE

A programming arrangement and adjustable programming element for use therein wherein the programmed output is readily adjusted for quick reprogramming during subsequent operating cycles. The programming arrangement comprises a panel member, an input shaft rotatably mounted on the panel member with a drive sprocket keyed to the shaft behind the panel member, and dial means indicating the relative angular position of the input shaft, a plurality of output shafts mounted on the panel, a driven sprocket secured to each output shaft for rotation therewith behind the panel and a clutch member on each output shaft, each clutch mounted for rotation relative to its output shaft when unclutched and for rotation with said shaft when clutched. The drive sprocket and driven sprocket being mounted in essentially the same plane and having an endless drive chain engaging them, and a camming means on each clutch member for engagement with suitable response means. The input and output shafts are arranged in a geometrical configuration such that the drive chain engages at least about 90° of the arc of each sprocket.

---

Figure 1:
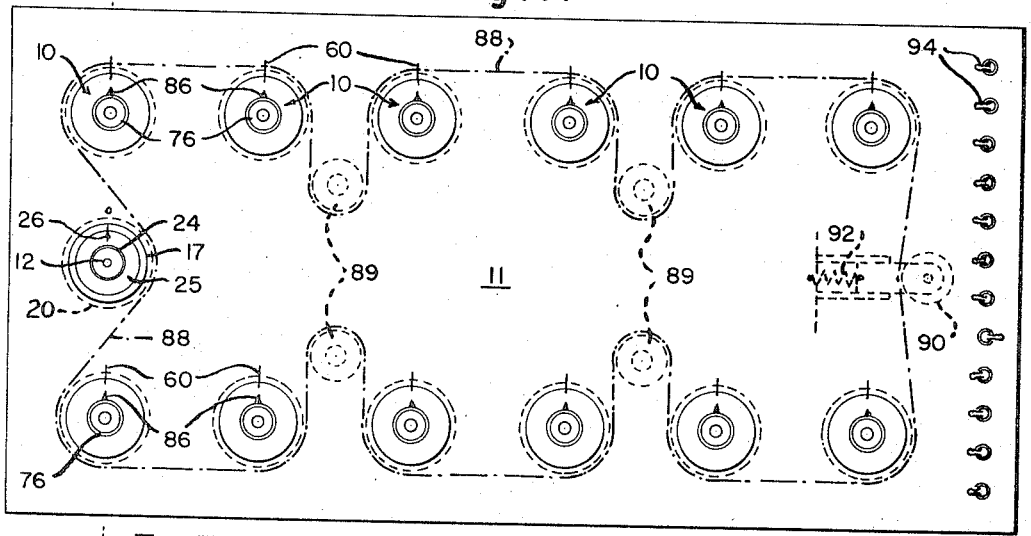

The present invention relates to an adjustable programming arrangement adapted to operate a relatively large number of programming elements in the course of a cycle of operations and in accordance with an input force imposed upon the arrangement. More particularly, the invention pertains to a programming arrangement and adjustable programming element used therein wherein the programmed output can be readily adjusted for quick reprogramming during subsequent operating cycles. The programming arrangement is especially adapted for use with a large number of such elements wherein the individual outputs thereof can be readily changed or adjusted or eliminated altogether from a given cycle of operations, in order to meet the demands of differing predetermined programs.

For certain programming applications or for use with particular items of equipment, in comparison with other applications or equipment, the present invention is an improvement upon applicant's copending and coassigned application entitled Adjustable Cam Programmer, filed Apr. 23, 1964, Ser. No. 362,002, now Patent No. 3,260,129.

In the programming of controls for machine tools, industrial furnace doors, and other cyclic or sequentially operated equipment, it is usually undesirable to have the programming elements, such as limit switches or the like, mounted upon or in the vicinity of the equipment. In the case of machine tools programmed in this matter, the programming elements are subject to contamination or other interference by chips or particles from the work being machined or by flooding with coolant, or otherwise adversely affected as in the case of magnetic fluxes in such equipment having magnetic chucks. With the aforementioned furnace door equipment, limit switches and related programming elements mounted thereon or adjacent thereto can be adversely affected by heat, dirt and/or scale. Moreover, such directly mounted programming components frequently have to be located in positions of difficult access, which often interferes with the accuracy of any change in programming that is to be made or requires a relatively long set-up time for a new program, in addition to the obvious difficulties of repair and maintenance.

The present invention overcomes the aforementioned difficulties by providing a programming arrangement which can be located at any convenient distance from the equipment being controlled thereby, in addition to permitting a relatively large number of programming elements to be controlled by a single input force. Moreover, the invention permits each programming element to be adjusted, changed or eliminated entirely from the arrangement without disturbing the calibration and operational sequence of the remaining programming devices. Adjustment or elimination of an individual programming element can be effected without opening the control panel in which the programming arrangement of the invention may be housed. Moreover, one or more of the programming elements can be eliminated from the operation of the programming arrangement without disturbing their previously adjusted settings, in the event that the thus eliminated elements are intended to be re-employed subsequently in original or similar programming. Thus, the number of events controlled in a given cycle of the programming arrangement can be readily increased or decreased in succeeding cycles together with the sequential relationships of their appearance.

Figure 2:
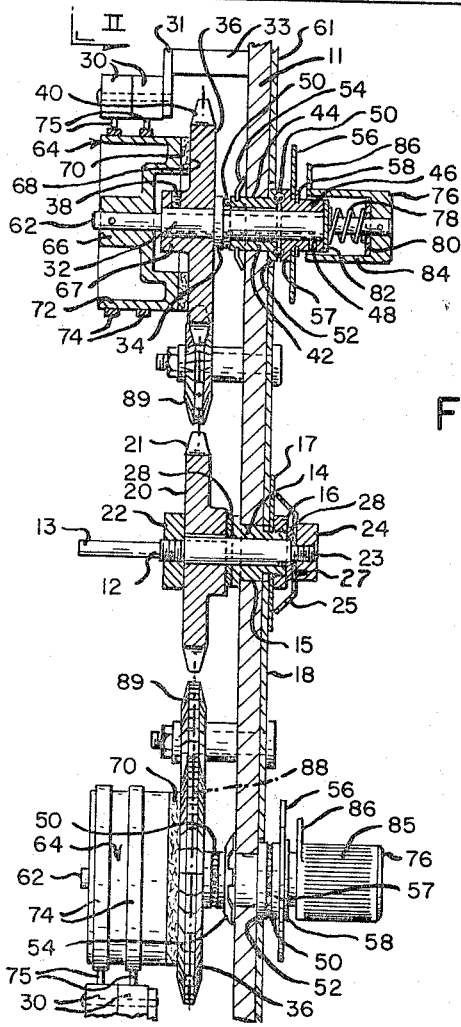

These and other objects, features and advantages of the invention together with structural details thereof, will be made apparent in the foregoing description of an illustraitve embodiment thereof, when taken in conjunction with the accompanying drawings, wherein:

FIGURE 1 is a view in frontal elevation of a portion of an instrument or consol panel having one arrangement of the invention mounted thereon, and FIGURE 2 is a cross-sectional view of the panel and programming arrangement of FIGURE 1 taken along reference line II—II thereof.

Referring more particularly to FIGURES 1 and 2 of the drawings the invention is illustratively embodied in an arrangement located upon an instrument or consol panel 11 for use in a programming cycle in which a relatively large number of programming elements designated generally by reference character 10 can be activated to control a series of program events in correspondence with a rotational input imposed upon an input shaft 12 by a principal drive element. This drive element (not shown) can be connected to a crank shaft, or to a speed reducer connected to the drive for a machine tool to be controlled, or to a selsyn-servo-mechanism responsive to a given operational characteristic of such equipment or to a simple timer motor depending upon the application of the invention.

The input shaft 12 is mounted in a bushing 14 which fits an appropriate opening 15 therefor in the panel 11. The bushing 14 desirably is fixed in place by a nut 16 engaging the threaded front end of the bushing. An annular input dial 17, which may be calibrated in any desired manner as determined by the application of the programming arrangement, is affixed to the front 18 of the panel by the aforementioned nut 16 with the central opening of the dial 17 being fitted over the threaded portion of the bushing 14. The shaft 12 is provided with an enlarged portion 19 which is fitted into and through the central opening of a drive sprocket 20 having peripheral teeth 21 shaped for engagement with the chain drive presently to be described. The drive sprocket 20 is keyed to the shaft 12 and held in axial position thereon by a second nut 22 which engages an inwardly extending, threaded portion of the shaft 12.

The front end of the shaft 12 is threaded at 23 and is engaged by a knob 24 having a registering flange 25 thereon and bearing an index marker 26 to cooperate with markings on the dial 17. Both the dial 17 and the flange 25 may be marked in angular degrees or with such other calibrations as may be desired for a particular programming service. As shown, dial 17 is preferably marked in terms of 360 individual degrees. The registering flange 25 is fastened to the underside of the knob 24 by one or more flush-headed screws 27.

Thrust members 28 (which can be provided in the form of roller thrust bearings or, as shown herein, nylon thrust washers) are abutted by the underside of the knob 24 and the forward face of the drive sprocket 20 to facilitate rotation of the shaft 12, the sprocket 20 and the knob 24 relative to the bushing 14 and dial 17 in correspondence with and when the inner end 13 of the shaft 12 is turned by the master rotational force of the program cycle. Normally, no adjustment of the portion of the apparatus just described is required once the knob 24 with its flange 25 are placed in the desired initial index position relative to the dial 17. Present day controls for machine tools and other programmed equipment, starting and stopping are sufficiently precise that, in the case of the illustrative arrangement, in the initial starting position with the index symbol 26 opposite 0 on the dial 17 a new cycle of the operation will commence; and after a rotation of 360° of the input shaft 12, the symbol 26 will come back to and stop precisely on such 0. It is to be understood, of course, that a program cycle may be some part of the revolution of 360°.

Cooperating with the input portion of the programming arrangement as just described, are a plurality of the aforementioned output or programming elements 10, which in this arrangement are substantially identical in construction. As this description proceeds it will be apparent that each of the program elements 10 can control one or a plurality of programmed events by using a plurality of micro-switches 30 or the like arranged respectively for actuation by the programming elements 10. In this arrangement of the invention twelve such programming elements 10 are employed with each programming element being capable of actuating a pair of response members or switch means for example, the microswitches 30. Obviously, however, a greater or lesser number of programming elements 10 and micro-switches can be employed depending upon the application of the invention.

As better shown in FIGURE 2 of the drawings each of the programming elements 10 includes a tubular output or driven shaft 32 having integrally formed thereon a bearing flange 34 against the side of which is seated a driven sprocket 36. The driven sprocket 36 is secured to the tubular shaft 32 for rotation therewith by means of a set screw 38, and is provided with a peripherally spaced array of teeth 40 having the configuration and spacing of that described above in connection with the drive sprocket 20. In this arrangement, the driven sprockets 36 are of the same size and are otherwise substantially identical so that the calibrations of the programming elements 10 are identical and identical adjustments and settings can be made as desired. The drive sprocket 20 is likewise of the same size and shape as the driven sprockets so that the drive ratio is 1:1 for simplicity of relative calibration and setting. A larger drive sprocket 20 can, of course, be utilized with the result that each programming makes more than one or perhaps several revolutions during each revolution of the input shaft 12. This results in closely spaced calibrations and multiple operation of each programming element during each rotation of the input shaft. Such multiple operation is undesirable in many programming sequences. A smaller drive sprocket 20, if used, would result in wider spaced calibrations at each programming element 10, which advantage, however, is offset by the greater chance of error in the operation of the programming arrangement.

In this example the micro-switches or switch means 30 are secured to a plate 31 and thence to a mounting post 33 which in turn is secured to the adjacent undersurface of the panel 11.

The tubular shaft 32 is journaled in a bushing 42 mounted in an opening 44 therefor in the console panel 11, and the tubular shaft 32 is positioned as shown in FIGURE 2 by means of a collar member 46 secured at its other end by means of set screw 48. Suitable anti-friction means such as ball bearings 50 are mounted on the confronting surfaces of the shaft collar 46, the bushing 42 and the shaft bearing flange 34 to facilitate rotation of the shaft 32 relative to the bushing 42. The bushing 43 is secured to the panel 11 by means of its outward peripheral flange 52 and an arcuate snap ring 54.

An annular, calibrated output dial 56 is mounted on the collar 46 in engagement with its bearing flange 57 where it is retained by a conventional snap ring arrangement 58. If desired, the dial 56 can be keyed or pinned to the collar flange 57 to ensure the absence of relative rotation therebetween. The dial 56 indicates the amount of input motion imparted to the driven sprocket 36 by means of suitable calibrations such as that described above in connection with the input dial 17, in cooperation with an index marker 60 suitably mounted on the panel 11 and preferably upon its protective covering 61. Mounted within the hollow of the tubular shaft 32 is a central auxiliary shaft 62, which is further arranged so as to be capable of rotations relative to the tubular drive shaft 32, when desired. At the lower end of the central shaft 62 is mounted a clutch member 64 of annular, inverted dished configuration. The clutch member 64 further is furnished with a central hub 66 whereby the clutch member is pinned to the lower end of the shaft 62, as viewed in FIGURE 2 of the drawings. The upper side of the clutch member 64 is provided with a central recess so as to receive the hub 67 of the driven sprocket 36 which is mounted closely adjacent thereto. On the annular upper surface 68 thus defined by the central recess of the clutch member 64, is mounted an annulus of suitable clutch lining material 70 for engagement with the adjacent surface of the driven sprocket 36. In furtherance of this purpose the aforementioned adjacent surface can be roughened suitably.

The outer peripheral portion 72 of the clutch member 64 appropriately serves as a holder for one or more cam members or surfaces denoted generally by reference characters 74 and positioned, in this example, to cooperate respectively with the switch means 30. In furtherance of this purpose each micro-switch or switch means 30 can be provided with a pin and cam roller arrangement 75 in engagement with the respective cam surfaces 74. Each cam surface 74 has imparted thereon a rise and dwell configuration consonant with the sequential predetermination of events to be controlled by the given programming element 10. Thus each cam surface 74 is provided with one or more rise and dwell portions angularly spaced about the periphery of the clutch member 64 to determine when and how often the micro-switch 30 is to be activated or deactivated, as the case may be, during each revolution of the clutch member 64.

In certain applications of the invention the cam surfaces 74 can be machined directly upon the outer or peripheral surface of the clutch member 64. On the other hand, in order to afford the use of widely differing programming sequences, other than that afforded by operation of the clutch arrangement presently to be described in greater detail hereinafter, or to change the programming signal of one of each pair of micro-switches 30 relative to its neighbor, the cam surfaces can be provided in the form of discrete and replaceable annular members replaceably mounted on the clutch member 64, for example, in the manner shown in applicant's aforementioned copending application. It is also to be understood that more or less of the camming surfaces 74 as shown in FIGURE 2 can be employed to advantage with this arrangement of the invention, together with an appropriate increase or decrease in the number of switches 30.

The clutch member 64 is biased into engagement with the driven sprocket 36 by means of a biased adjustment knob 76 of hollowed or inverted cup-shaped configuration. The knob 76 is provided with an upper central opening through which the upper end of the auxiliary shaft 62 extends and is pinned for movement only with the knob 76.

The outer surface of the cylindrical portion of the adjustment knob 76 desirably is knurled as denoted by reference character 85 (FIGURE 2) to facilitate operator handling thereof.

Although other suitable biasing means can be employed, a coil spring 78, capable of exerting the necessary force, is preferred in this arrangement of the invention. The spring 78 is retained by a pair of washers 80 and 82 respectively abutting the lower inner surface of the knob 76 and the upper ends of the tubular shaft 32 and its collar 46. The flange portion 84 of the adjustment knob 76 extends to a position in proximity to the input dial 56 where a pointer or other suitable indexing means 86 is affixed for cooperation with the dial 56. However, sufficient clearance is allowed between the lower edges for the adjustment knob 76 and the dial 56 and associated structure to allow relative displacement of the knob 76 and the auxiliary shaft 62 relative to the tubular shaft 32 for the purpose of disengaging the clutch member 64 from the driven sprocket 36. At this time, the angular disposition of the knob 76, the auxiliary shaft 62 and the clutch member 64 can be adjusted relative to that of the driven sprocket 36 and hence to the input motion delivered to the drive sprocket 20 described above. The amount of such displacement is indicated by the pointer 86 at its new position relative to the output dial 56. In like manner the angular disposition of the camming means 74 of each programming element 10 can be adjusted relative to camming means 74 of other programming elements, to the input shaft 12 as well. With the wide range of adjustment just described together with the provisions for replacing, withdrawing and relatively adjusting the cam members 74 of each programming element it will be apparent that the arrangement of the invention can be programmed to a wide range of controlled and sequenced signals, although it is of course, contemplated that some or all of the programming elements 10 can be set to produce simultaneous signals.

Referring now more particularly to FIGURE 1 of the drawings, it will be seen that the twelve programming elements 10 mentioned previously are arranged for actuation of their driven sprockets 36 by means of an endless drive chain 88. The drive chain 88 is wound in a modified serpentined fashion about the driving sprocket 20 and the driven sprockets 36. To attain this desired configuration of the driven chain 88 and thereby to maintain substantially 90° of arc contact of each sprocket with the drive chain so as to minimize back lash and attendant operational inaccuracies, a number of idler sprockets 89 are mounted on the underside of the panel 11 and spaced to impart the desired configuration to the drive chain 88. In this example of the invention, four such idler sprockets are employed with the sprockets being mounted on suitable shafts therefor, which are in turn respectively journaled in bushing members secured to the panel 11 at the locations shown in FIGURE 1.

Thus, the drive and driven sprocket arrangement 20, 88, 36 affords optimum driving power with a minimum number of idler sprockets 89. In addition, the spatial distribution of the drive sprocket 20, the driven sprockets 36 and the idlers 89 are such that each of the programming elements rotate in the same direction to provide unidirectional calibrations and settings with consequent ease of operator reading and manipulation.

The structure of the idler sprockets and their associated shafts and bushings is similar to that described in connection with the drive sprocket 20 and associated components, with the exception that the idler sprocket and its components are smaller; and therefore will not be further described herein. The inevitable slack of the chain drive arrangement is taken up by means of a spring loaded sprocket arrangement 90 also mounted on the underside of the panel 11. The take-up spring 92 is arranged to exert the necessary biasing force, depending on the size of the programming arrangement and of the chain drive.

Each of the programming elements 10 can have its switch means 30 eliminated from the programming circuit by actuation of an associated one of the on-off switches 94. In this arrangement each on-off switch is the double-pole single-throw variety and thus controls a related pair of the micro-switches 30. Obviously, each one of each pair of micro-switches 30 can be individually controlled through the use of twice the number of switches of the single-pull single-throw variety.

From the foregoing it will be evident that a large number of programming elements 10 can be manipulated by the programming arrangement of the invention for a single given input motion, that such programming elements are readily adjustable relative to one another and to the input motion, and that the sequenced or simultaneous signal or signals of each programming element can be adjusted relative to one another or relative to the signal sequence of preceeding cycles. Moreover, one or more of the signal or signals controlled by each programming element can be readily eliminated from the programming circuit. Hence, the number of programming elements controlled by the arrangement can be readily increased or decreased simply by switching in or out of the circuit of related programmed signals. Moreover, the sequential orientation of the programmed signals can be changed, adjusted or re-oriented at any time in a given program cycle. Finally, it should be pointed out that all programming and programming changes can be handled with greater precision and celerity and with considerably reduced operator time. Moreover, such changes can be made at a location remote from the machine or other equipment to be operated in accordance with such program or programs.

Various changes in the illustrated arrangements of the invention may be made by those skilled in the art without departing from the spirit and scope of the invention. Moreover, it is to be understood that certain features of the invention can be utilized without a corresponding use of other features.

Accordingly, what is claimed is:

1. In a programming element, the combination comprising a support, means mounting a journal bushing on said support, a tubular output shaft journaled for rotational movement in said bushing, anti-frictional means for securing said output shaft in said bushing against relative longitudinal movement, drive means secured adjacent one end of said output shaft for imparting rotation thereto, dial means mounted adjacent the other end of said output shaft for rotation therewith, stationary index means on said support for indicating rotational displacement in cooperation with said dial means, an auxiliary drive shaft extending through said output shaft and mounted for rotation therein, said auxiliary shaft terminating at one end in a clutch member disposed closely adjacent to said drive means, camming means mounted on the outer periphery of said clutch member for engagement with a response element, means for applying a longitudinal biasing force to said auxiliary shaft in a direction to urge said clutch member into clutching engagement with said drive means, means engaging the other end of said auxiliary shaft for disengaging said clutch member against the action of said biasing means and for rotating said clutch member relative to said drive means and said output shaft, and additional index means secured to said auxiliary shaft adjacent said other end, said last-mentioned index means positioned adjacent said dial means to indicate the amount of relative rotation of said clutch member with respect to said drive means.

2. In a programming element, the combination comprising a support, means rotatively mounting a tubular output shaft on said support, an annular drive element secured to one end of said shaft for rotation therewith, dial means secured adjacent the other end of said output shaft for rotation therewith at a position adjacent said support for cooperation with fixed index means on said support, an auxiliary shaft extending through said tubular output shaft and terminating at one end in a clutch member disposed closely adjacent said driven member, adjustment knob mounted on the other end of said auxiliary shaft and spaced from the adjacent end of said tubular shaft, biasing spring means confined between said knob and the adjacent tubular shaft end for urging said clutch member into engagement with said drive element, said auxiliary shaft being longitudinally and rotatably movable within said tubular output shaft to permit disengagement of said clutch member and relative rotation thereof with respect to said drive element, additional index means secured to said adjustment knob for indicating in cooperation with said dial means the rotational displacement of said clutch member relative to said drive element, and cam means mounted on said clutch member for engagement with response means.

3. In a programming element, the combination comprising a support, a tubular output shaft extending through said support and terminating at one end in an annular drive element, means rotatably mounting said output shaft on said support, dial means secured to the other end of said output shaft for rotation therewith, said dial means cooperating with index means on said support to indicate rotational displacement of said output shaft and drive element, an auxiliary shaft mounted for longitudinal and rotational movement within said output shaft and extending therethrough, said auxiliary shaft terminating at one end in an annular clutch member and at the other end thereof in a cup-shaped adjustment knob with the hollow open end of said knob extending to a position adjacent said dial means, a biasing spring surrounding said auxiliary shaft and retained between said adjustment knob and the adjacent other end of said output shaft, additional index means secured to the open end of said knob and cooperating with said dial means to indicate the rotational displacement of said clutch member relative to said drive element and cam means disposed on the outer periphery of said clutch member for engagement with suitable response means.

4. In a programming arrangement, the combination comprising a panel member, an input shaft rotatably mounted on said panel member, a drive sprocket having peripheral teeth and keyed to said shaft behind said panel member, dial means for indicating the relative angular position of said input shaft, a plurality of output shafts rotatably mounted on said panel member, a driven sprocket having peripheral teeth and secured to each of said output shafts for rotation therewith behind said panel member, a clutch member for each of said output shafts, each of said clutch members being mounted for rotation relative to its respective output shaft when unclutched therewith and for rotation with said output shaft when in clutched connection thereto, said drive sprocket and said driven sprockets being mounted in essentially the same plane, an endless drive chain engaging said driving and said driven sprockets, and camming means on each of said clutch members for engagement for suitable response means.

5. In a programming arrangement, the combination comprising a panel member, an input shaft rotatably mounted on said panel member, a drive sprocket having peripheral teeth and keyed to said shaft behind said panel member, dial means for indicating the relative angular position of said input shaft, a plurality of output shafts rotatably mounted on said panel member, a driven sprocket having peripheral teeth and secured to each of said output shafts for rotation therewith behind said panel member, a clutch member for each of said output shafts, each of said clutch members being mounted for rotation relative to its respective output shaft when unclutched therewith and for rotation with said output shaft when in clutched connection thereto, said drive sprocket and said driven sprockets being mounted in essentially the same plane, an endless drive chain engaging said driving and said driven sprockets, and camming means on each of said clutch members for engagement with suitable response means, said input and said output shafts being arranged in a geometrical configuration such that said drive chain engages at least about 90° of arc of each of said drive and said driven sprockets.

6. In a programming arrangement, the combination comprising a panel member, an input shaft rotatably mounted on said panel member, a drive sprocket having peripheral teeth and keyed to said shaft behind said panel member, dial means for indicating the relative angular position of said input shaft, a plurality of output shafts rotatably mounted on said panel member, a driven sprocket having peripheral teeth and secured to each of said output shafts for rotation therewith behind said panel member, a clutch member for each of said output shafts, each of said clutch members being mounted for rotation relative to its respective output shaft when unclutched therewith and for rotation with said output shaft when in clutched connection thereto, said drive sprocket and said driven sprockets being mounted in essentially the same plane, an endless drive chain engaging said driving and said driven sprockets, camming means on each of said clutch members for engagement with suitable response means, a plurality of idler sprockets rotatably mounted on said panel member at an elevation relative thereto such that said idler sprockets lie essentially in said plane, said output shafts and their corresponding driven sprocket being arranged into groups of opposed pairs on said panel board and said idler sprockets being disposed between adjacent pairs of output shafts and inwardly thereof such that said drive chain assumes a modified serpentine configuration about said driven sprockets and said idler sprockets whereby said drive chain engages at least about 90° of arc of each of said driven sprockets, and an additional spring loaded idler sprocket engaging said drive chain to impose a constant tensile force thereto.

7. In a programming arrangement, the combination comprising a panel member, an input drive shaft rotatably mounted on said panel member, a drive sprocket having peripheral teeth and keyed to said input shaft behind said panel member, dial means in front of said panel member for indicating the relative angular position of said input shaft, a plurality of tubular output shafts rotatably mounted on said panel member, a driven sprocket secured to each of said output shafts for rotation therewith behind said panel member, said drive and said driven sprockets lying in essentially the same plane, an endless drive chain engaging each of said drive and said driven sprockets, an auxiliary output shaft extending through each of said tubular shafts and terminating at one end in a clutch member, each of said clutch members being mounted for rotation with its associated output shaft when in clutched connection with the associated driven sprocket, means secured to the other end of each of said auxiliary shafts for disengaging said clutch member and for moving said clutch member relative to its associated driven sprocket, indicating means secured to each said other auxiliary shaft end and to the adjacent end of each of said output shafts to indicate the relative angular position of the associated output shaft and to indicate the relative angular displacement of the associated clutch member relative to said output shaft, and camming means on the outer periphery of each of said clutch members for engagement with suitable response means.

8. In a programming element, the combination comprising a support, a tubular output shaft rotatably mounted on said support and terminating at one end in an annular drive element, an auxiliary shaft extending through said tubular shaft and terminating at one end in a clutch member disposed adjacent said drive element, said clutch member and said auxiliary shaft being mounted for rotation with said output shaft when in clutched connection to said drive element, means on the other end of said auxiliary shaft for disengaging said clutch member and for angularly displacing said clutch member and said auxiliary shaft relative to said drive element, and indicating means secured to said support and auxiliary shaft at other end and to the adjacent end of said tubular shaft for indicating the relative angular position of said tubular shaft and for indicating the rotational displacement of said clutch member relative to said drive element and its tubular shaft, and camming means on the outer periphery of said clutch member for engagement with suitable response means.

References Cited
UNITED STATES PATENTS

| | | | |
|---|---|---|---|
| 1,446,652 | 2/1923 | Morris | 192—95 |
| 2,016,806 | 10/1935 | Schellenbach | 192—95 |
| 2,185,714 | 1/1940 | Scherer | 192—95 |
| 2,457,367 | 12/1948 | Hale | 192—95 |
| 2,670,039 | 2/1954 | Burkholder | 200—38 |
| 2,892,047 | 6/1959 | Smith | 200—38 |

FRED C. MATTERN, JR., *Primary Examiner.*

J. A. WONG, *Examiner.*